United States Patent [19]

Herschfelt

[11] Patent Number: 5,311,460

[45] Date of Patent: May 10, 1994

[54] METHOD AND APPARATUS FOR PERFORMING HIGH SPEED DIVIDE OPERATIONS

[75] Inventor: Michael H. Herschfelt, Ben Lomond, Calif.

[73] Assignee: Cirrus Logic, Inc., Fremont, Calif.

[21] Appl. No.: 999,315

[22] Filed: Dec. 31, 1992

[51] Int. Cl.⁵ .............................................. G06F 7/52
[52] U.S. Cl. ..................................................... 364/761
[58] Field of Search ......................... 364/761, 764–767

[56] References Cited

U.S. PATENT DOCUMENTS

| | | | |
|---|---|---|---|
| 4,935,892 | 6/1990 | Nishiyama et al. | 364/746.2 |
| 5,012,439 | 4/1991 | Nash et al. | 364/766 |
| 5,027,309 | 6/1991 | Koumoto et al. | 364/766 |

Primary Examiner—Tan V. Mai
Attorney, Agent, or Firm—Blakely, Sokoloff, Taylor & Zafman

[57] ABSTRACT

A method and circuit for calculating the quotient, and remainder terms of a division operation. The circuit includes a plurality of identical stages repeated for each binary bit of the dividend. Each stage receives a single data bit from the dividend, and two or more bits from the remainder terms created by the next more significant bit. The plurality of stages produce the quotient bit and remainder terms, based on the value of the divisor much more quickly than is possible using prior art techniques.

4 Claims, 12 Drawing Sheets

Fig. 1

| | INPUT | | | OUTPUT | | |
|---|---|---|---|---|---|---|
| INPUT$_{10}$ | RIN A(MSB) | RIN B | D(LSB) | q(MSB) | ROUT A | ROUT B(LSB) |
| 0 | 0 | 0 | 0 | 0 | 0 | 0 |
| 1 | 0 | 0 | 1 | 0 | 0 | 1 |
| 2 | 0 | 1 | 0 | 0 | 1 | 0 |
| 3 | 0 | 1 | 1 | 1 | 0 | 0 |
| 4 | 1 | 0 | 0 | 1 | 0 | 1 |
| 5 | 1 | 0 | 1 | 1 | 1 | 0 |
| 6 | 1 | 1 | 0 | x | x | x |
| 7 | 1 | 1 | 1 | x | x | x |

|  | INPUT | | | | OUTPUT | | | |
|---|---|---|---|---|---|---|---|---|
| INPUT₁₀ | RIN A(MSB) | RIN B | RIN C | D(LSB) | Q(MSB) | ROUT A | ROUT B | ROUT C |
| 0 | 0 | 0 | 0 | 0 | 0 | 0 | 0 | 0 |
| 1 | 0 | 0 | 0 | 1 | 0 | 0 | 0 | 1 |
| 2 | 0 | 0 | 1 | 0 | 0 | 0 | 1 | 0 |
| 3 | 0 | 0 | 1 | 1 | 0 | 0 | 1 | 1 |
| 4 | 0 | 1 | 0 | 0 | 0 | 1 | 0 | 0 |
| 5 | 0 | 1 | 0 | 1 | 1 | 0 | 0 | 0 |
| 6 | 0 | 1 | 1 | 0 | 1 | 0 | 0 | 1 |
| 7 | 0 | 1 | 1 | 1 | 1 | 0 | 1 | 0 |
| 8 | 1 | 0 | 0 | 0 | 1 | 0 | 1 | 1 |
| 9 | 1 | 0 | 0 | 1 | 1 | 1 | 0 | 0 |
| 10 | 1 | 0 | 1 | 0 | x | x | x | x |
| 11 | 1 | 0 | 1 | 1 | x | x | x | x |
| 12 | 1 | 1 | 0 | 0 | x | x | x | x |
| 13 | 1 | 1 | 0 | 1 | x | x | x | x |
| 14 | 1 | 1 | 1 | 0 | x | x | x | x |
| 15 | 1 | 1 | 1 | 1 | x | x | x | x |

| INPUT | | | | | | | | OUTPUT | | | | | | |
|---|---|---|---|---|---|---|---|---|---|---|---|---|---|---|
| INPUT10 | RIN A(MSB) | RIN B | ... | RIN Y-1 | RIN Y | D(LSB) | Q(MSB) | ROUT A | ROUT B | ... | ROUT Y-1 | ROUT Y | ROUTZ |
| 0 | 0 | 0 | ... | 0 | 0 | 0 | 0 | 0 | 0 | ... | 0 | 0 | 0 |
| 1 | 0 | 0 | ... | 0 | 0 | 1 | 0 | 0 | 1 | ... | 0 | 1 | 1 |
| 2 | 0 | 0 | ... | 0 | 1 | 0 | 0 | 1 | 0 | ... | 1 | 0 | 2 |
| 3 | 0 | 0 | ... | 0 | 1 | 1 | 0 | 0 | 0 | ... | 1 | 0 | 3 |
| ... | ... | ... | ... | ... | ... | ... | ... | ... | ... | ... | ... | ... | ... |
| Z-1 | 0 | - | ... | - | - | - | 0 | W | W | ... | W | W | Z-1 |
| Z | 0 | - | ... | - | - | - | 1 | 0 | 0 | ... | 0 | 0 | 0 |
| Z+1 | - | - | ... | - | - | - | 1 | 0 | 0 | ... | 0 | 1 | 1 |
| ... | ... | ... | ... | ... | ... | ... | ... | ... | ... | ... | ... | ... | ... |
| 2Z-1 | 1 | - | ... | - | - | - | 1 | W | W | ... | W | W | Z-1 |
| 2Z | 1 | - | ... | - | - | - | x | x | x | ... | x | x | x |
| ... | ... | ... | ... | ... | ... | ... | ... | ... | ... | ... | ... | ... | ... |
| 2(Y+1)-1 | 1 | 1 | ... | 1 | 1 | 1 | x | x | x | ... | x | x | x |

W IS '1' OR '0' SUCH THAT THE REMAINDER OUTPUT IS OF VALUE Z-1
x IS DON'T CARE
Y IS EQUAL TO THE NUMBER OF REMAINDER TERMS FOR A DIVIDE BY Z
- IS '1' OR '0' DEPENDING ON Z

Fig. 8

| INPUT₁₀ | INPUT | | | | | OUTPUT | | | | |
|---|---|---|---|---|---|---|---|---|---|---|
| | RIN A (MSB) | RIN B | RIN C | D (LSB) | Q (MSB) | ROUT A | ROUT B | ROUT C | ROUT7 | |
| 0 | 0 | 0 | 0 | 0 | 0 | 0 | 0 | 0 | 0 | |
| 1 | 0 | 0 | 0 | 1 | 0 | 0 | 0 | 1 | 1 | |
| 2 | 0 | 0 | 1 | 0 | 0 | 0 | 1 | 0 | 2 | |
| 3 | 0 | 0 | 1 | 1 | 0 | 0 | 1 | 1 | 3 | |
| 4 | 0 | 1 | 0 | 0 | 0 | 1 | 0 | 0 | 4 | |
| 5 | 0 | 1 | 0 | 1 | 0 | 1 | 0 | 1 | 5 | (Z-1) |
| 6 | 0 | 1 | 1 | 0 | 0 | 1 | 1 | 0 | 6 | (Z) |
| 7 | 0 | 1 | 1 | 1 | 1 | 0 | 0 | 0 | 0 | |
| 8 | 1 | 0 | 0 | 0 | 1 | 0 | 0 | 1 | 1 | |
| 9 | 1 | 0 | 0 | 1 | 1 | 0 | 1 | 0 | 2 | |
| 10 | 1 | 0 | 1 | 0 | 1 | 0 | 1 | 1 | 3 | |
| 11 | 1 | 0 | 1 | 1 | 1 | 1 | 0 | 0 | 4 | |
| 12 | 1 | 1 | 0 | 0 | 1 | 1 | 0 | 1 | 5 | |
| 13 | 1 | 1 | 0 | 1 | 1 | 1 | 1 | 0 | 6 | (2Z-1) |
| 14 | 1 | 1 | 1 | 0 | X | X | X | X | X | (2Z) |
| 15 | 1 | 1 | 1 | 1 | X | X | X | X | X | |

METHOD AND APPARATUS FOR PERFORMING HIGH SPEED DIVIDE OPERATIONS

BACKGROUND OF THE INVENTION

The present invention is a circuit for performing high speed division having particular application when high speed address calculation is needed, for example, where a new address is required in single clock cycle. An example of an application where high speed division operations is desirable is processing of data representing images for display on a color monitor. In the prior art, division is typically implemented as a succession of subtract and shift operations. Descriptions of prior art subtract and shift circuits may be found in U.S. Pat. No. 5,012,439; ."Division: Part IV", IEEE Computer Society Press; Computer Arithmetic; Vol. I, 1990, pp. 156-194. A faster method utilizes parallel processing of each quotient bit as described in U.S. Pat. No. 4,935,892. However, the circuitry required to implement the teachings of this patent is massive, and is still too slow.

SUMMARY OF THE INVENTION

The essence of this invention is the use of remainder terms that are created by one stage and passed to a less significant adjacent stage. For example, see FIG. 1. where, for a single bit of a dividend D(i) with a single bit quotient q(i), for a divisor of three, there are two input remainder terms RIN(i)A and RIN(i)B from the next higher significant stage and there are two output remainder terms ROUT(i)A and ROUT(i)B to the next lower significant stage. Each quotient bit, and the remainder terms are created according to a truth table that is specific for each divisor. The inputs to the truth table or stage are the remainder terms of the previous stage and the dividend input. Of these inputs, the dividend is the least significant bit and the remainder terms are the more significant bits.

An important feature of the invention is that it allows for the fast creation of remainder terms. The remainder terms flow from the most significant stage, to the least significant stage, in a similar manner as does the carry chain of an addition operation, which flows in the opposite direction.

The implementation of a stage for a particular divisor according to the invention is easily achieved, using standard CMOS design techniques, and leads to a fast propagation of the remainder terms. By coupling stages for a particular divisor in series, divisions can be performed for any size dividend. Additionally, by use of a multiplexor and shift registers to which receive the quotients for circuits for different divisors, it is possible to create a circuit capable of performing very fast division operations for any predetermined set of divisors.

DETAILED DESCRIPTION OF THE INVENTION

Using prior art techniques, performing division for the divisors of 3, 5, 6, 7, 9... (i.e., those that are not one or a power of two) is time consuming and hardware expensive, relative to division by divisors which are a power of 2 for which the quotient is obtained mostly by shift operations. Although the invention is particularly advantageous for odd divisors, the invented technique can be used to create a quotient for all divisors, odd or even. It can also be combined with other standard design techniques such as bit-shifting or division by 2 to any power, and/or multiplexing to obtain results for any desired set of divisors.

Figure 1:
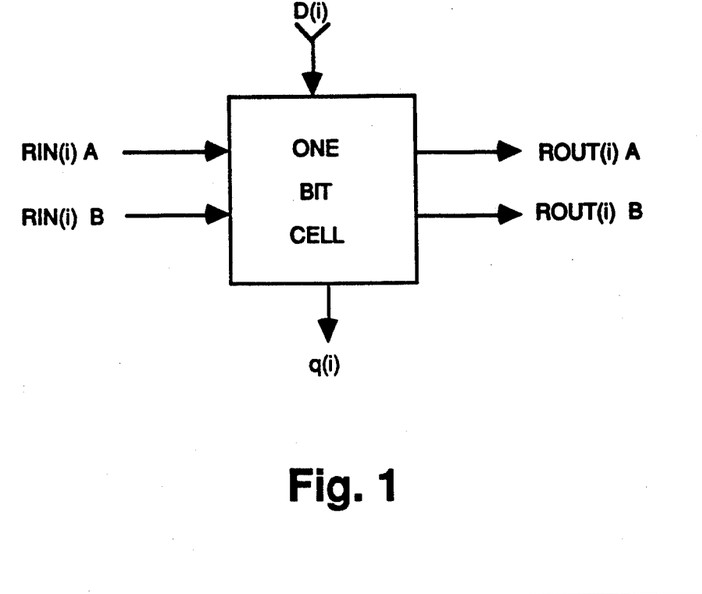
FIG. 1 is a drawing that shows the flow of remainder terms in and out, and the dividend in and the quotient out for a single stage in a divide by three operation.
Figure 2:
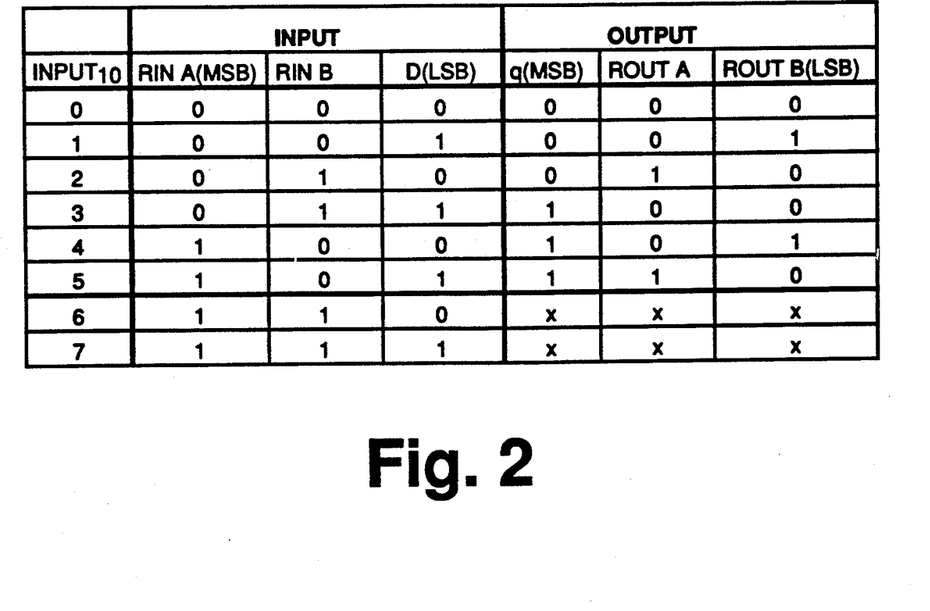
FIG. 2 is the truth-table for a divide by three operation.

FIG. 2 is a truth table showing the inputs and outputs of a divide by three operation for a single stage of the type shown in FIG. 1. That is, the dividend (D) is represented in the truth table as the least significant bit of the input, while the quotient (q) is represented as the most significant bit of the output. The remainder terms are represented in the truth table as the most significant bits of the input remainder terms (RIN A and RIN B) and the least significant bits of the output remainder terms (ROUT A and ROUT B).

For example, for a dividend of 7, i.e., $111_2$, three stages of the type shown in FIG. 1 would be needed, with the dividend D(i), for i=0 to 2, represented by D(2), D(1) and D(0), each set to 1, and the remainder input terms RIN(2) A and RIN(2) B set to 0. Based on the truth table of FIG. 2, RIN(1) A is 0, RIN(1) B is 1, RIN(0) A is 0 and RIN(0) B is 0. Further, q(2) is 0, q(1) is 1 and q(0) is 0, giving as a result $010_2$ with a remainder of $01_2$, i.e., $2_{10}$ with a remainder of 1.

Figure 3A:
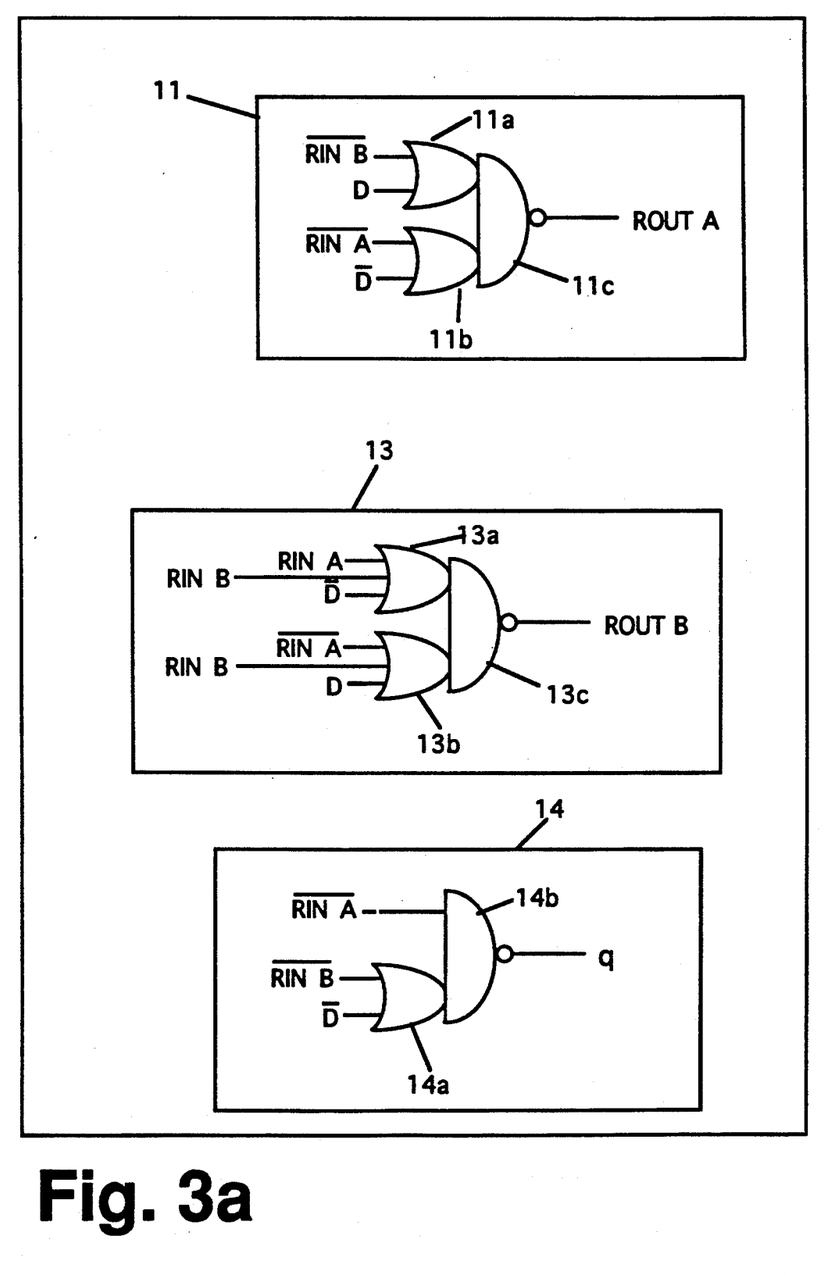
FIG. 3a is a logic gate level diagram of an implementation of a stage which performs a divide by three operation according to the present invention.

FIG. 3a is a logic gate circuit which may be utilized for the creation of the quotient and remainder terms for a divisor of three for a single stage of the type shown in FIG. 1. It is also a description of the truth-table of FIG. 2 which describes the relationship between inputs and outputs. The truth-table has a radix of three, which is the divisor. It should be noted that the inversions of RIN A, RIN B and D namely RIN A, RIN B and $\overline{D}$ respectively, are not obtained by inverting RIN A, RIN B and B but rather by a circuit comparable to blocks 11, 13 and for the prior remainder term and dividend value, modified to produce inverted outputs whose timings are the same for RIN A, RIN B and D respectively. The circuit details for producing such inverted outputs are well known to persons skilled in the art and, therefore, are not set forth herein.

In FIG. 3a, the remainder term ROUT A is created by block 11 by ORing RIN B and D using OR gate 11a, ORing RIN A and $\overline{D}$ using OR gate 11b, and then performing a NAND operation on the results of the two OR operations using NAND gate 11c. The remainder term ROUT B is created by block 13 by ORing RIN A, RIN B and $\overline{D}$ using OR gate 13a, ORing RIN A, RIN B and D using OR gate 13b, and then performing a NAND operation on the results of the two OR operations using NAND gate 13c. The quotient q is created by block 14 by ORing RIN B and D using OR gate 14a and then performing a NAND operation using RIN A and the results of the OR operation by OR gate 14a using NAND gate 14b. As previously noted, the logic gates of FIG. 3a are simply a logic circuit implementation of the truth table of FIG. 2.

Figure 3B:
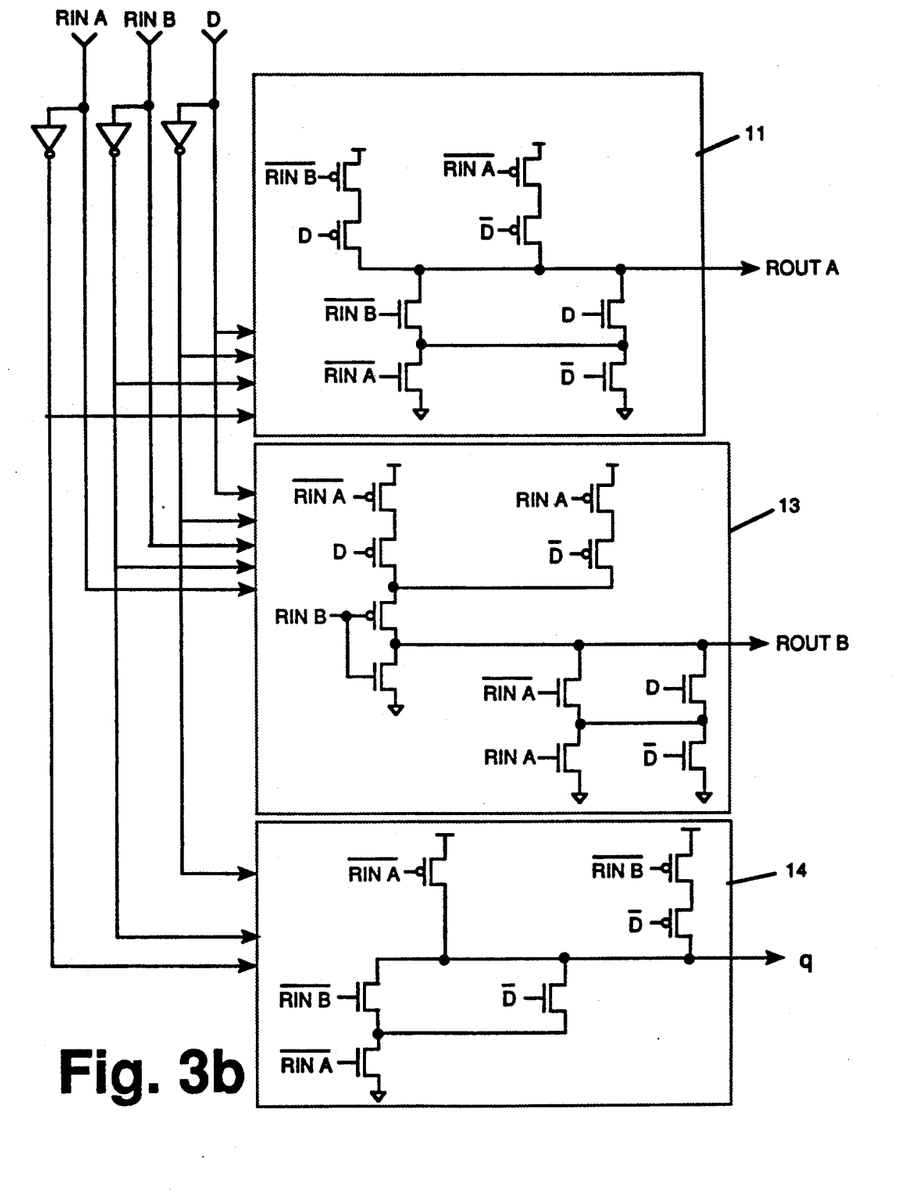
FIG. 3b is a schematic of an implementation of a divide by three stage of the type shown in FIG. 3a using CMOS transistors.

In FIG. 3b, block 11 representing ROUT A for the stage is a circuit implementation using CMOS transistors for performing the complex logic operations performed by circuit equivalent block 11 of FIG. 3a. Similarly, block 13 representing ROUT B for the stage and block 14 representing q are each a circuit for performing the complex logic operations performed by circuit equivalent blocks 13 and 14 respectively of FIG. 3a. That is, the CMOS transistor circuit of the complex logic operations performed by the blocks 13 and 14 of FIG. 3b are shown in FIG. 3a by their equivalent logic gate circuits. Thus, FIGS. 2, 3a and 3b illustrate the equivalency between a truth table, a logic gate circuit and a CMOS transistor circuit.

Figure 4:
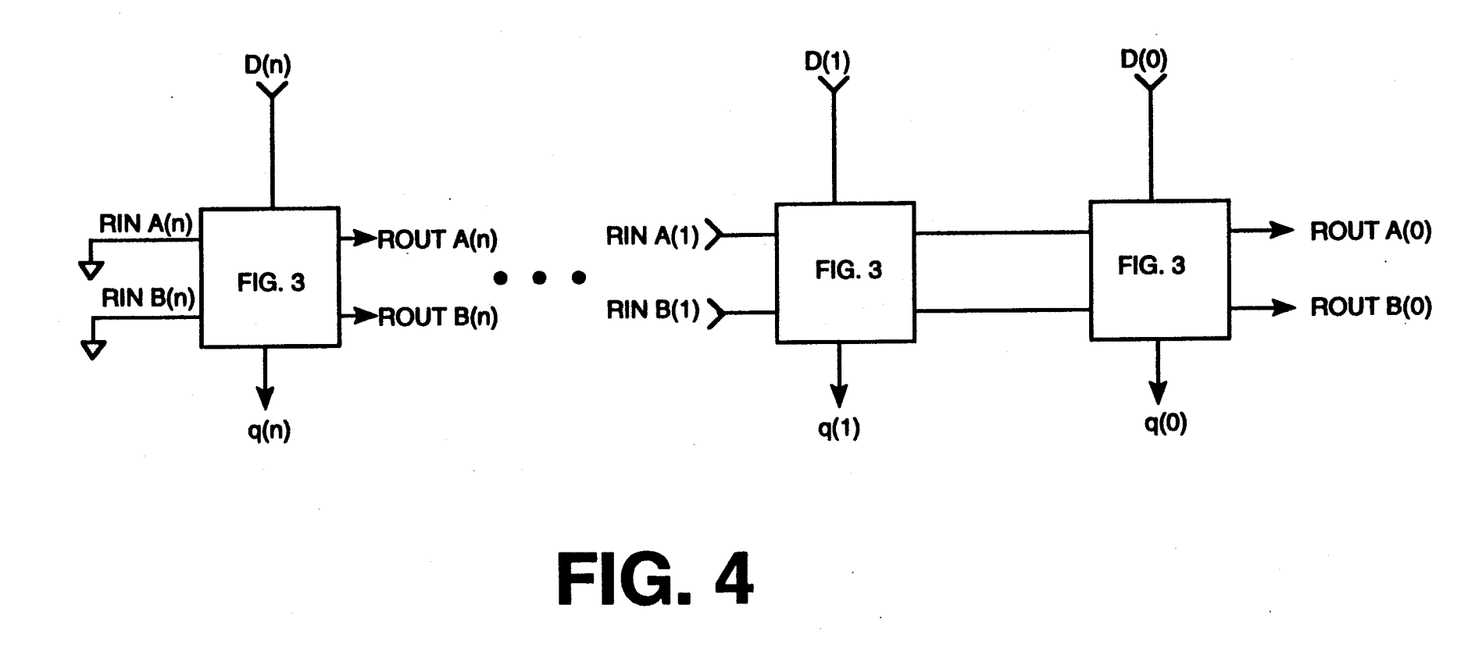
FIG. 4 is a block diagram showing a divide by three operation for an n+1 bit dividend.

FIG. 4 is a block diagram overview of a circuit for performing division for a divisor of 3 according to the invention. It uses the circuit of FIG. 3a or FIG. 3b (plus appropriate circuits for the inversions of RIN A and RIN B) for each of the bits, with the most significant stage (n) on the left, and the least significant stage (0) on the right. The input remainder terms of the most significant stage (RIN A(n) and RIN B(n)) are forced to zero. This initiates the remainder term generation, which flows from left to right. There is no limit to the number of stages that can be used in this chain. Thus, the circuit can be easily adapted to handle any size dividend.

Figure 5:
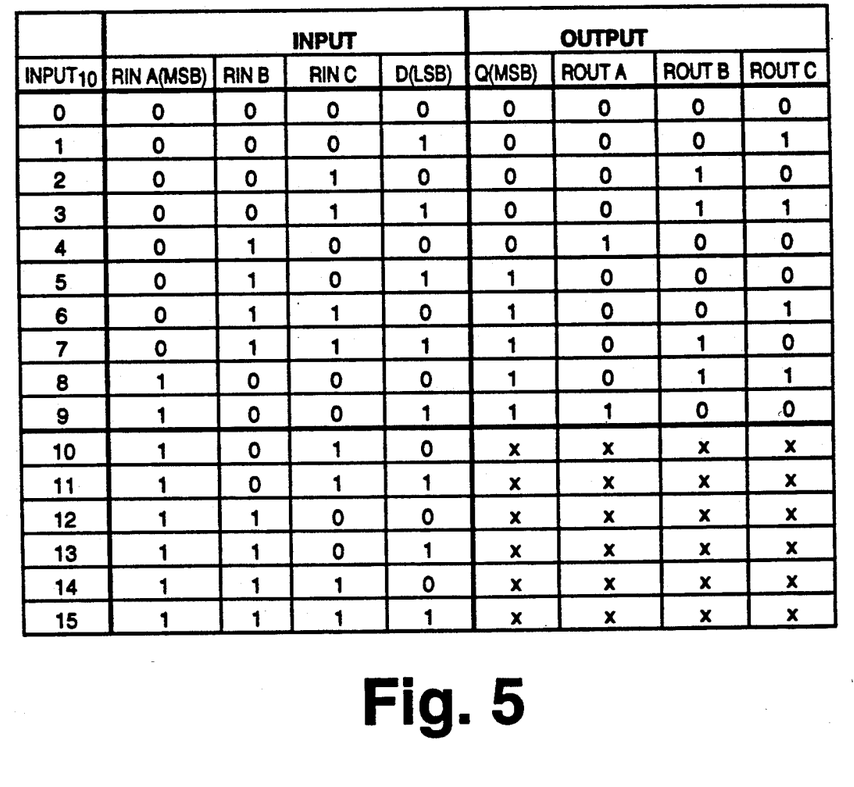
FIG. 5 is the truth-table for a divide by five operation.
Figure 6A:
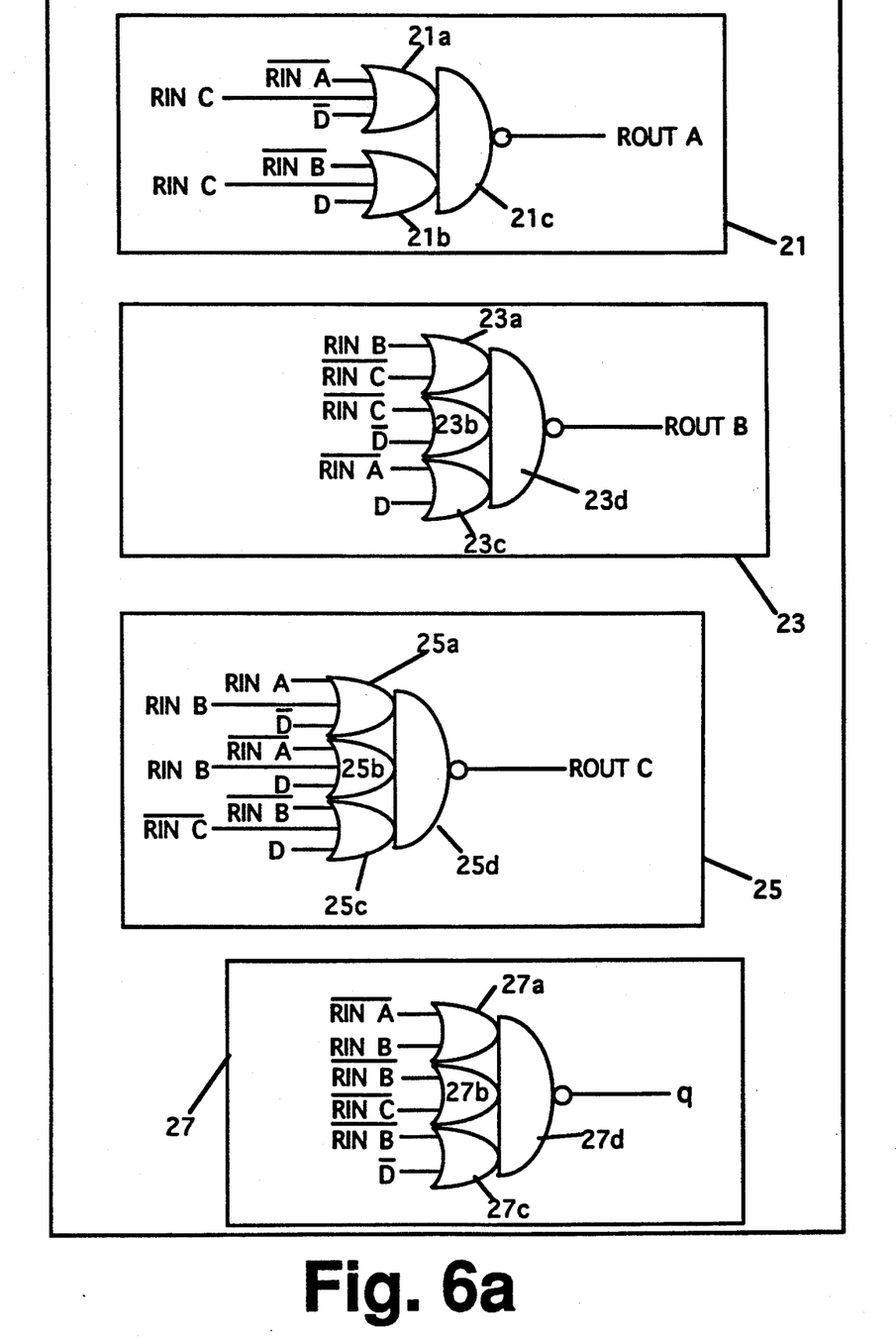
FIG. 6a is a logic gate level diagram of an implementation of a stage which performs a divide by five operation according to the present invention.
Figure 6B:
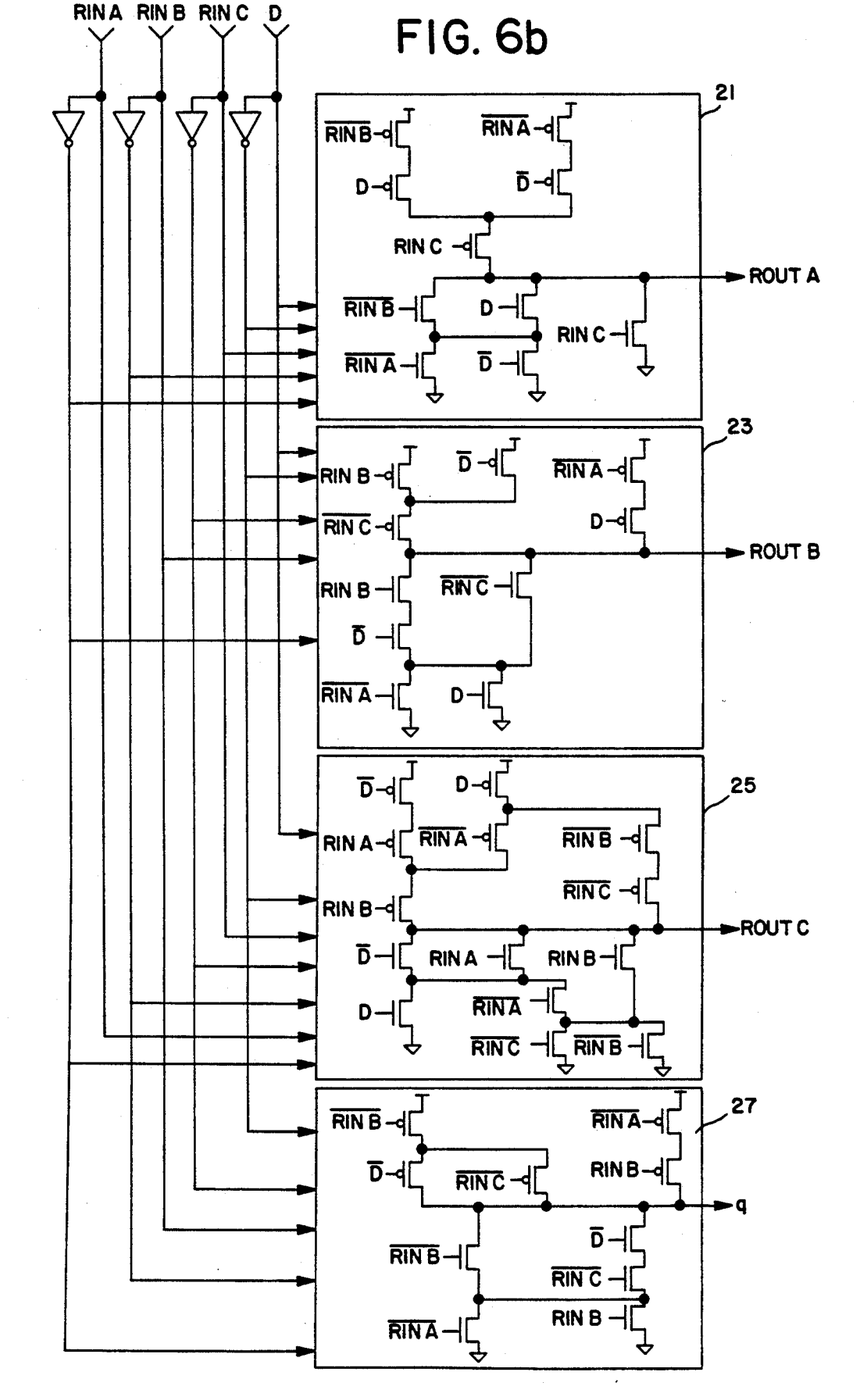
FIG. 6b is a schematic of an implementation of a divide by five stage of the type shown in FIG. 6a using CMOS transistors.
Figure 7:
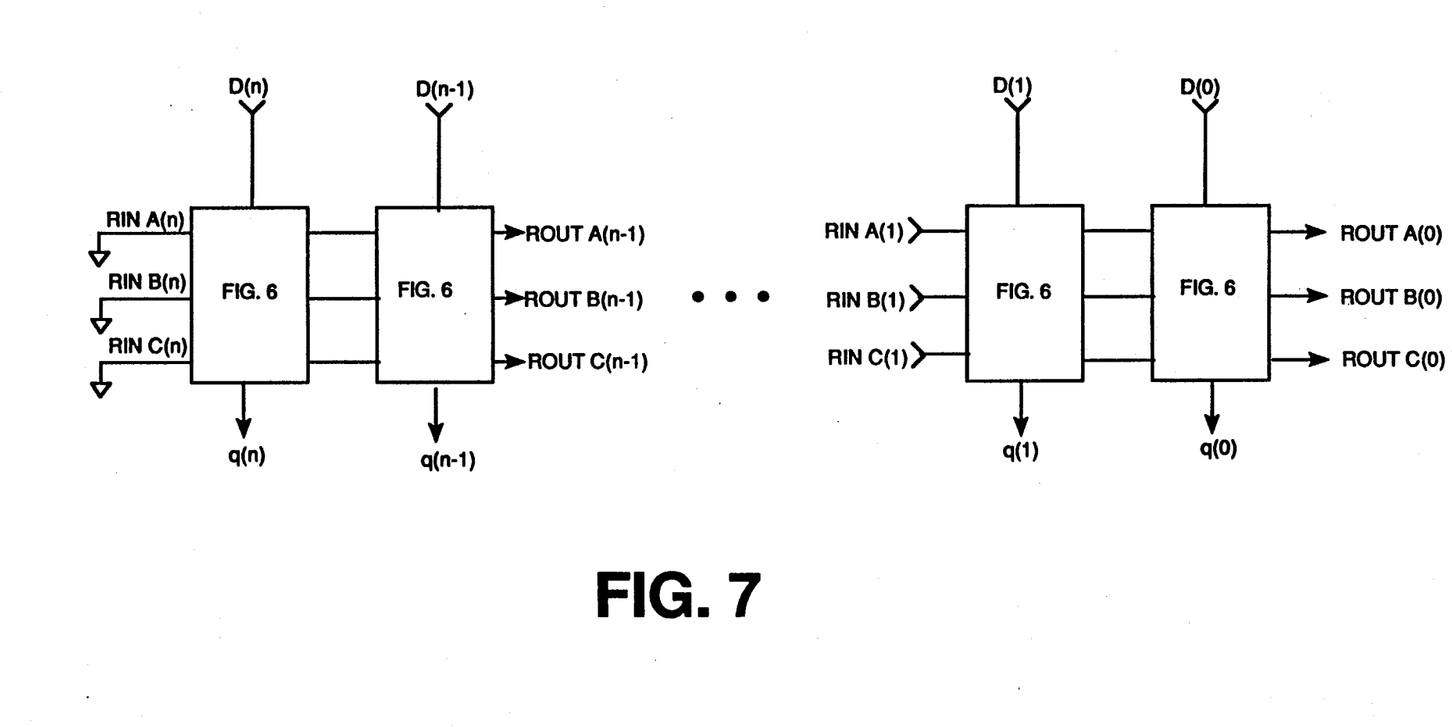
FIG. 7 is a block diagram showing a divide by five operation for an n+1 bit dividend.

For a divisor of five, reference is made to FIG. 5 which is a truth table for a divisor of five, FIG. 6a and/or 6b which is a circuit which may be utilized for the creation of the quotient and remainder terms for a divisor of five for a single stage of the type shown in FIG. 1, and FIG. 7 which, like FIG. 4, is a block diagram overview diagram of a circuit for performing division for a divisor of five rather then for a divisor of three, using the circuit of FIG. 6a (or 6b) rather than the circuit of FIG. 3a (or 3b).

From the truth table of FIG. 5, it will be noted that a divisor of 5 requires three remainder terms designated in FIG. 5 as A, B and C or RIN A, RIN B and RIN C for the inputs and ROUT A, ROUT B and ROUT C for the outputs. The reason three remainder terms are required is that for a divide by 5, the remainder can only be 0, 1, 2, 3 or 4. Since 4 requires three bits for its binary representation, three remainder terms are required. However, since three bits can represent up to the number 7, remainders of 5, 6 and 7 are impossible for a divide by 5. Hence, the truth table of FIG. 5 shows all combinations from a four bit input, but results which would have a remainder of 5, 6 or 7 are shown as 'x' or don't care in FIG. 5.

In this connection, FIG. 6a is a logic gate circuit implementation of the truth table of FIG. 5. As previously noted, inputs which are inversions of the remainder of the prior stage are are generated by circuitry which is not expressly shown in FIG. 6a, but which is identical in operation to that of blocks 21, 23 and 25 shown in FIG. 6a, except that the terms which are generated are an inversion of the corresponding terms shown in FIG. 6a. The details of such additional circuitry would be readily apparent to persons skilled in the art and, therefore, are not shown in FIG. 6a.

In FIG. 6a, block 21 representing ROUT A for the stage is a logic gate circuit for performing what is known as a complex logic operation. Block 21 of FIG. 6a uses OR gates 21a and 21b and NAND gate 21c. A CMOS description of the complex logic operations performed by the block 21 of FIG. 6a are shown in block 21 of FIG. 6b which is a schematic representation of a CMOS transisitor implementation of the logic gates of block 21 of FIG. 6a. Similarly, block 23 of FIG. 6b representing ROUT B for the stage, block 25 of FIG. 6b representing ROUT C and block 27 of FIG. 6b representing q are each a CMOS transistor circuit implementation for performing the complex logic operations shown by the logic circuits of blocks 21, 23, 25 and 27 respectively of FIG. 6a. Block 23 of FIG. 6a uses OR gates 23a, 23b and 23c and NAND gate 23d. Block 25 of FIG. 6a uses OR gates 25a, 25b and 25c and NAND gate 25d. Block 27 of FIG. 6a uses OR gates 27a, 27b and 27c and NAND gate 27d.

FIG. 7 is a block diagram overview of a circuit for performing division for a divisor of 5 according to the invention. It uses the circuit of FIG. 6a (plus appropriate circuits for the inversions of RIN A, RIN B and RIN C) for each of the bits, with the most significant stage (n) on the left, and the least significant stage (0) on the right. The input remainder terms of the most significant stage (RIN A(n), RIN B(n) and RIN C(n))are forced to zero. This initiates the remainder term generation, which flows from left to right. There is no limit to the number of stages that can be used in this chain. Thus, the circuit can be easily adapted to handle any size dividend.

From the Figures for divisors of three and five, a pattern becomes apparent which may be utilized for any integer divisor. From these Figures, a generalized truth table can be created for an arbitrary divisor Z having Y remainder terms as shown in FIG. 8 which will be explained with reference to the truth table for a divisor of 7 shown in FIG. 9.

Figure 8:
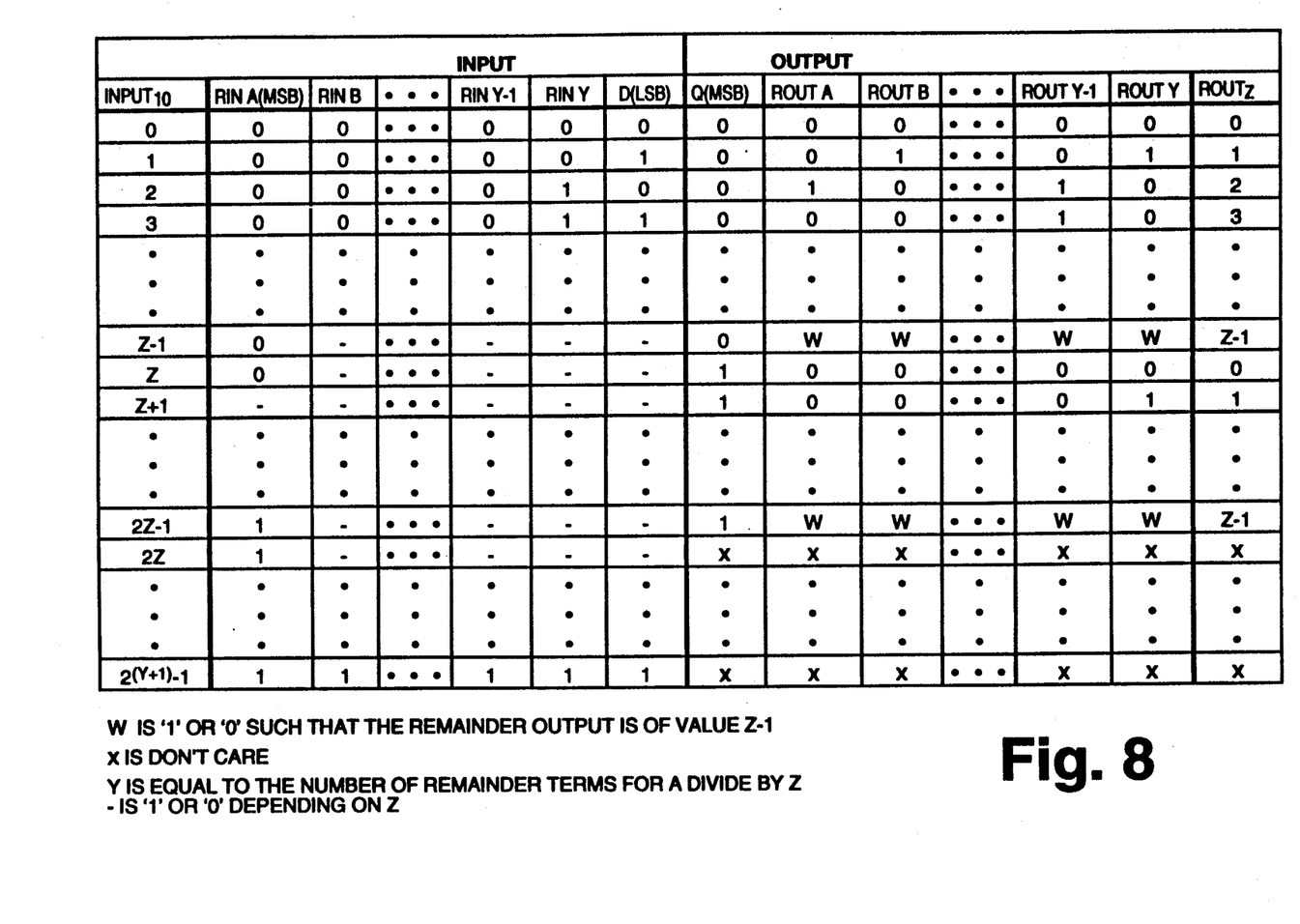
FIG. 8 is the truth-table for a divide by Z operation, where Z is any integer.
Figure 9:
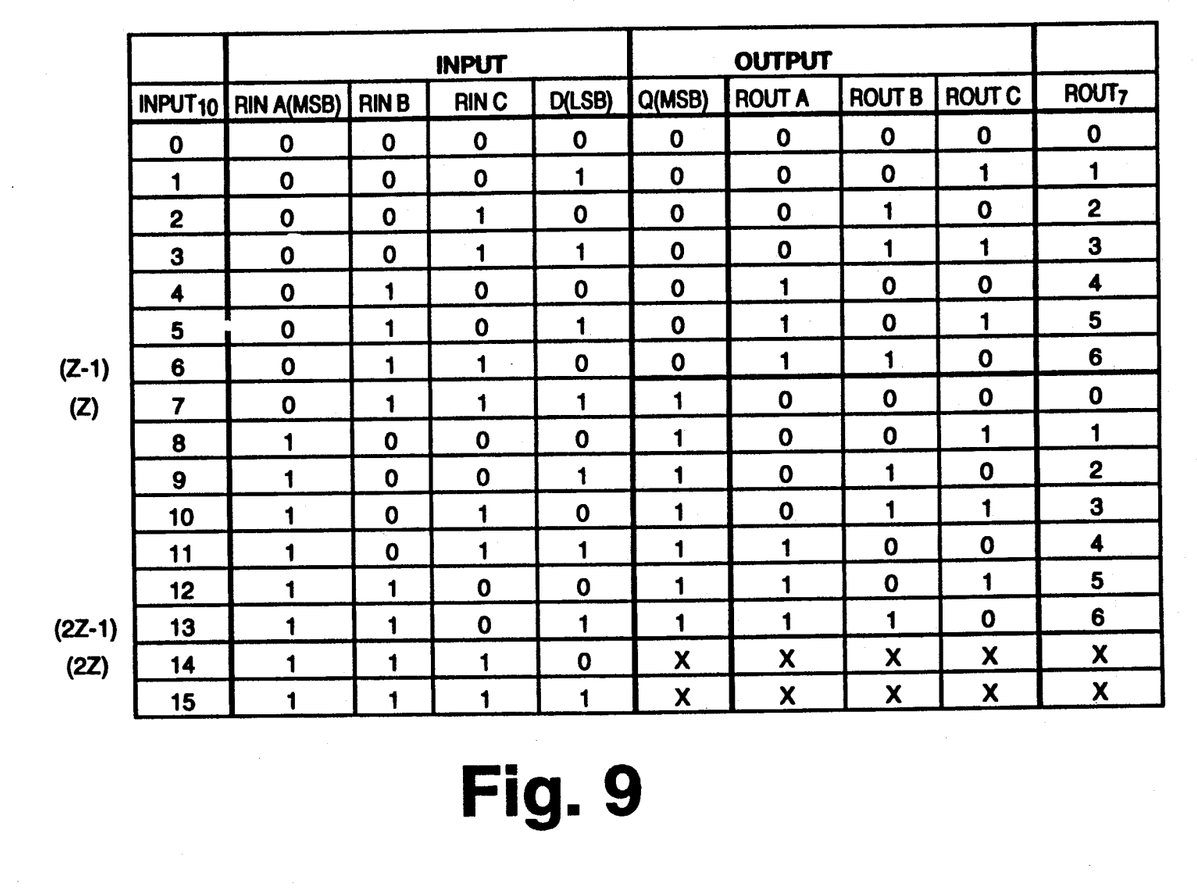
FIG. 9 is the truth-table for a divide by 7 operation.
Figure 10:
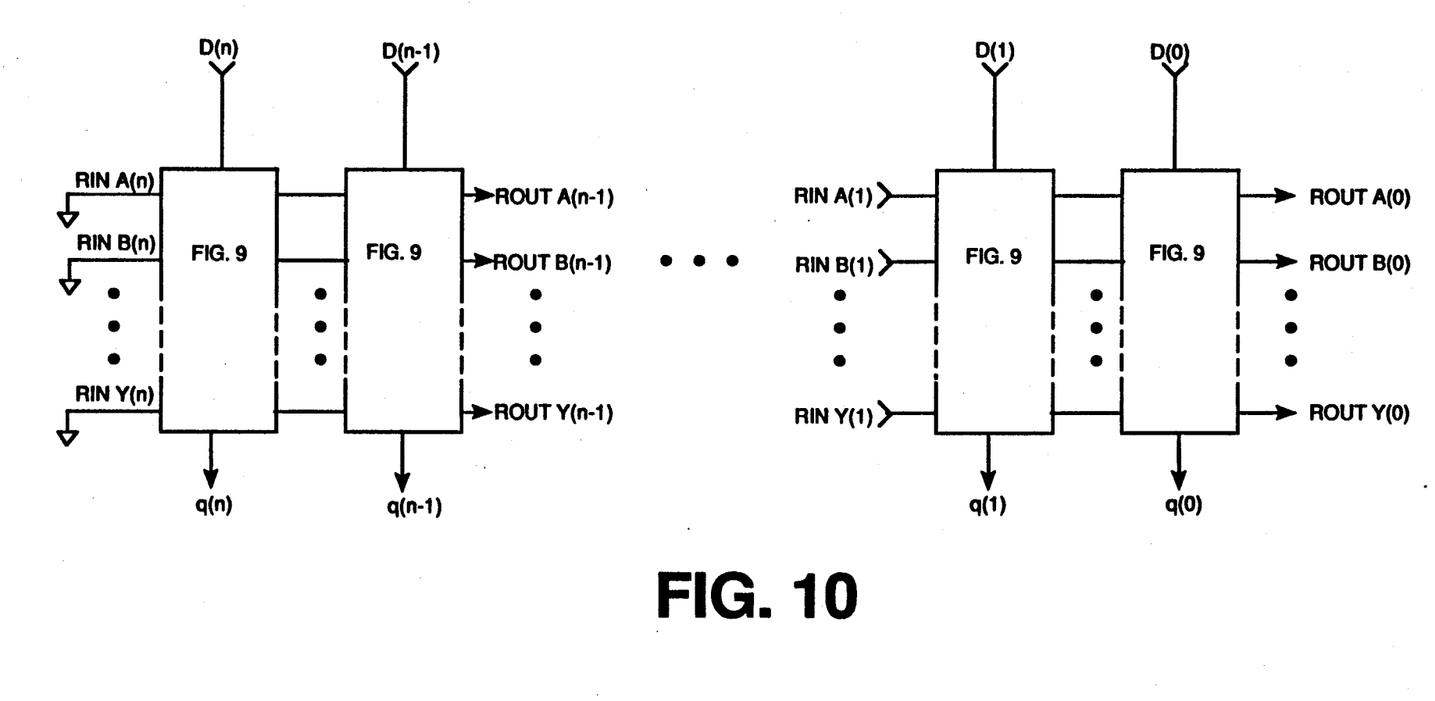
FIG. 10 is a block diagram showing a divide by Z operation having Y remainder terms for an n+1 bit dividend.

FIG. 8 is a truth table for a divisor of Z, where Z is any integer, and FIG. 9 which is a truth te'ıle for a divide by 7 for explaining the generalized truta table of FIG. 8 for a divisor of Z. In this connection, it should be noted that in FIG. 9, the divisor Z is 7. Thus, the truth table shows the rows of the truth table for input values from 0 to 15 with input value 6 corresponding to Z−1, input value 7 corresponding to Z, input value 13 corresponding to 2Z−1 and input value 14 corresponding to 2Z. FIG. 10 is a block diagram overview of a circuit for performing division for a divisor of Z according to the invention. It uses a circuit corresponding to the truth table of FIG. 8 for each of the bits, with the most significant bit (n) on the left, and the least significant bit (0) on the right.

For an arbitrary divisor Z, the number of remainder terms Y input as bits to a stage according to the present invention is equal to the number of remainder terms output as bits from the stage. The number of remainder terms or bits, designated as Y, is calculated as the Y which satisfies the formula $2^Y \geq Z \geq 2^{(Y-1)}$, where Z is the divisor. For example, for a divisor of 7, $2^Y \geq 7 \geq 2^{(Y-1)}$, Y=3; for a divisor of 11, $2^Y \geq 11 \geq 2^{(Y-1)}$; Y=4.

After calculating the number of remainder terms Y for the divisor Z as explained above, a truth table can be created where the number of input terms is $2^{(Y+1)}$ and ranges from 0 to $2^{(Y+1)}-1$, and the output values are 0 to Z−1 for q=0 and then 0 to Z−1 for q=1. For input values that are greater than the value that produced the output of Z−1 for q=1, the output values are "don't care" and are shown as x in the truth tables.

In FIG. 8, the table elements designated as W represent a value which is a set of 1's and 0's such that the resulting value represented by ROUT A:ROUT Y is equal to the input for input values less than Z, 0 for an input value equal to Z and the input value −Z for input values greater than Z (but less than 2Z and x or don't care for values greater than or equal to 2Z).

This pattern should be readily apparent from the truth table for a divide by 7 shown in FIG. 9. That is where Z is 7, Y is 5 and the input 10 ranges from 0 to $2^{(Y+1)}-1$ or 0 to 15. For an input of Z−1 or 6, ROUT A, ROUT B and ROUT C are 1 1 0 with a q of 0 since 6 divided by 7 is 0 with a remainder of 6. For an input of Z or 7, ROUT A, ROUT B and ROUT C are 0 0 0 with a q of 1 since 7 divided by 7 is 1 with a remainder of 0. The output values are shown in FIG. 9 for the decimal values of ROUT A, ROUT B and ROUT C only. That is, the value of q is not shown as part of the ROUT7 column.

Each bit of the output remainder term is calculated independently of the other bits of the output remainder term. Each bit of the output remainder term may be implemented by ORing each decoded input value that produces a 1 in the corresponding bit on the output side of the truth table. The decoded input values are produced by AND gates with the proper input values, where the input value is inverted or not inverted depending on the value decoded. For example, for a divide by 7, with reference to the truth table of FIG. 9, ROUT C, ROUT B and ROUT A are obtained as follows:

ROUT C : OR input values of 1, 3, 5, 8, 10, 12.
ROUT B : OR input values of 2, 3, 6, 9, 10, 13.
ROUT A : OR input values of 4, 5, 6, 11, 12, 13.

Input values of 14 and 15 which produce "don't care" for the remainder term outputs may be ORed as well if desired in order to simplify the logic.

Figure 11:
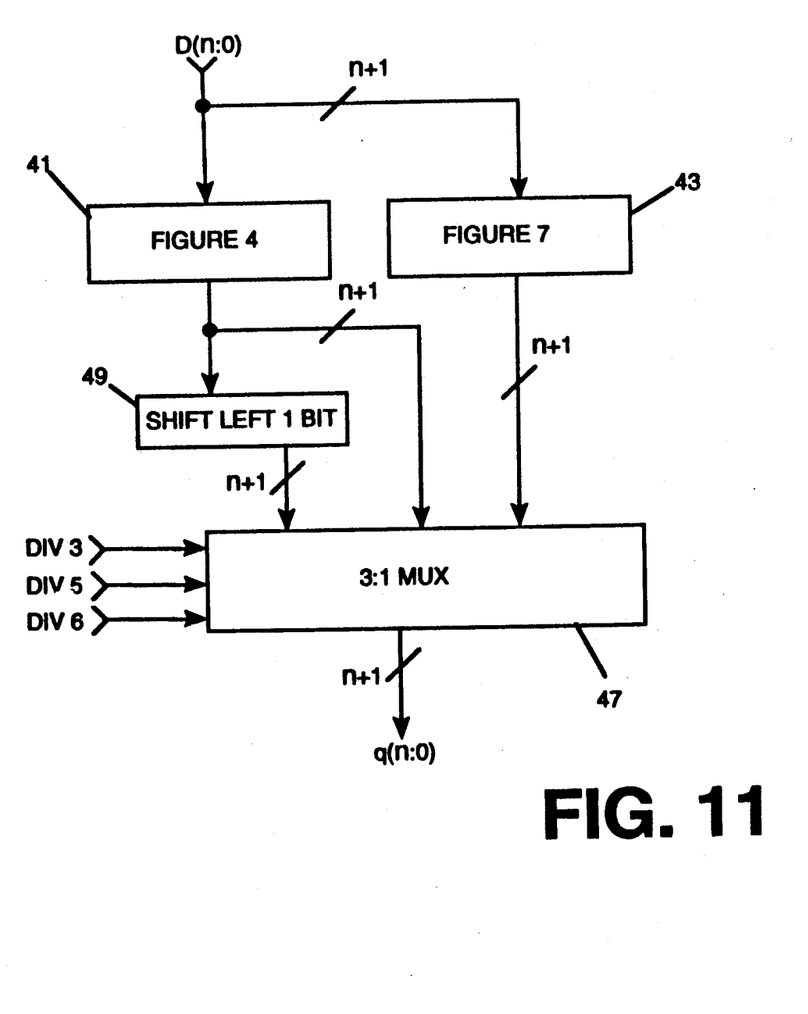
FIG. 11 is a block diagram showing an implementation of the invention for obtaining results by combining circuits for performing divisions for different divisors.

The foregoing describes a method and apparatus for performing high speed divide operations for a particular predetermined divisor. By combining circuits for performing divides by specific divisors, a circuit for performing divide operations for multiple divisors can be obtained. In this connection, FIG. 11 is a block diagram showing how circuits for divisors of three 41 and five 43 may be combined with a multiplexor 47 and shift register 49 to produce a divide by 3, 5 or 6. Of course, other combinations are possible, the specifics of which should be readily apparent to persons skilled in the field of the invention.

I claim:
1. A plurality of identical stages for performing division for a predetermined divisor and an n+1 bit dividend, each of said stages comprising:
 a) means for generating a predetermined plurality of one bit remainder terms;
 b) means for generating a one bit quotient;
 wherein the number of said plurality of stages is equal to n+1, and each of said stages has as an input said predetermined plurality of one bit remainder terms from an adjacent stage as its most significant bits and a corresponding bit of said dividend as its least significant bit, and has as its output a corresponding bit of said quotient as its most significant bit and said generated predetermined plurality of one bit remainder terms as its least significant bits, and wherein the stage corresponding to the n bit of the dividend has 0 as its predetermined plurality of one bit remainder term inputs.

2. A stage as defined in claim 1 wherein said remainder term generating means is a plurality of complex logic circuits corresponding to said plurality of remainder terms wherein each of said complex logic circuits is adapted to decode a corresponding remainder term input so as to form:
 a) an output of remainder terms which i) are equal to corresponding remainder term inputs to the stage for an input value less than said divisor; ii) are equal to 0 for an input value equal to said divisor; and iii) are equal to corresponding remainder term inputs minus and divisor for an input value greater than said divisor;
 b) a quotient output which is i) equal to 0 for an input value less than said divisor; ii) equal to 1 for an input value equal to said divisor; and iii) equal to 1 for an input value greater than said divisor.

3. An apparatus for performing high speed divide operations for a plurality of divisors using a circuit as defined by claim 1 for at least some of said plurality of divisors, said apparatus comprising:
 a) multiplexor means for receiving divide operation results from said circuits corresponding to said at least some of said plurality of divisors;
 b) control means coupled to said multiplexor means for selecting one of said divide operation results to be passed by said multiplexor means.

4. A method for performing high speed divide operations using a plurality of stages, each stage utilizing a logic gate circuit which is identical for each stage, said method comprising the steps of:
 a) forming in each of said stages an output of remainder terms which i) are equal to corresponding remainder term inputs for an input value less than said divisor; ii) are equal to 0 for an input value equal to said divisor; and iii) are equal to corresponding remainder term inputs minus said divisor for an input value greater than said divisor;
 b) generating in each of said stages a quotient output which is i) equal to 0 for an input value less than said divisor; ii) equal to 1 for an input value equal to said divisor; and iii) equal to 1 for an input value greater than said divisor.

* * * * *